US011836258B2

(12) United States Patent
Siman et al.

(10) Patent No.: US 11,836,258 B2
(45) Date of Patent: Dec. 5, 2023

(54) DETECTING EXPLOITABLE PATHS IN APPLICATION SOFTWARE THAT USES THIRD-PARTY LIBRARIES

(71) Applicant: Checkmarx Ltd., Ramat Gan (IL)

(72) Inventors: Maty Siman, Tel Aviv (IL); Or Chen, Tel Aviv (IL)

(73) Assignee: CHECKMARX LTD., Ramat Gan (IL)

( * ) Notice: Subject to any disclaimer, the term of this patent is extended or adjusted under 35 U.S.C. 154(b) by 280 days.

(21) Appl. No.: 17/382,390

(22) Filed: Jul. 22, 2021

(65) Prior Publication Data
US 2022/0035928 A1 Feb. 3, 2022

Related U.S. Application Data

(60) Provisional application No. 63/057,534, filed on Jul. 28, 2020.

(51) Int. Cl.
*G06F 21/57* (2013.01)
*G06F 8/75* (2018.01)

(52) U.S. Cl.
CPC .............. *G06F 21/577* (2013.01); *G06F 8/75* (2013.01); *G06F 2221/033* (2013.01)

(58) Field of Classification Search
CPC ..... G06F 21/577; G06F 8/75; G06F 2221/033
See application file for complete search history.

(56) References Cited

U.S. PATENT DOCUMENTS

| 5,107,418 A | 4/1992 | Cramer et al. |
| 5,485,616 A | 1/1996 | Burke et al. |
| 5,586,328 A | 12/1996 | Caron et al. |
| 5,586,330 A | 12/1996 | Knudsen et al. |

(Continued)

FOREIGN PATENT DOCUMENTS

| CA | 2200812 A1 | 9/1998 |
| JP | 2003050722 A | 2/2003 |

(Continued)

OTHER PUBLICATIONS

Pingali et al., "Optimal Control Dependence Computation and the Roman Charlots Problem", ACM Transactions on Programming Languages and Systems, vol. 19, No. 3, pp. 462-485, May 1997.

(Continued)

*Primary Examiner* — Meng Li
(74) *Attorney, Agent, or Firm* — KLIGLER & ASSOCIATES PATENT ATTORNEYS LTD

(57) ABSTRACT

A method for software code analysis includes receiving source code of an application program, which includes one or more calls from respective entry points in the source code to a library program. The source code is automatically analyzed in order to generate a first data flow graph (DFG), representing a flow of data to be engendered upon running the application program. One or more vulnerabilities are identified in the library program. The library program is automatically analyzed to generate a second DFG linking at least one of the entry points in the source code to at least one of the vulnerabilities. The first DFG is combined with the second DFG in order to track the flow of data from the application program to the at least one of the vulnerabilities and to report at least one of the vulnerabilities as being exploitable.

24 Claims, 3 Drawing Sheets

(56) References Cited

U.S. PATENT DOCUMENTS

| | | | |
|---|---|---|---|
| 5,701,489 A | 12/1997 | Bates et al. | |
| 5,742,811 A | 4/1998 | Agrawal et al. | |
| 5,778,233 A | 7/1998 | Besaw et al. | |
| 5,790,858 A | 8/1998 | Vogel | |
| 5,875,334 A | 2/1999 | Chow et al. | |
| 5,881,290 A | 3/1999 | Ansari et al. | |
| 5,978,588 A | 11/1999 | Wallace | |
| 6,226,787 B1 | 5/2001 | Serra et al. | |
| 6,442,748 B1 | 8/2002 | Bowman-Amuah | |
| 7,210,133 B2 | 4/2007 | Souloglou et al. | |
| 7,237,265 B2 | 6/2007 | Reshef et al. | |
| 7,284,274 B1 | 10/2007 | Walls et al. | |
| 7,363,616 B2 | 4/2008 | Kalyanaraman | |
| 7,392,545 B1* | 6/2008 | Weber | G06F 21/577 713/188 |
| 7,447,666 B2 | 11/2008 | Wang | |
| 7,565,631 B1 | 7/2009 | Banerjee et al. | |
| 7,647,631 B2 | 1/2010 | Sima | |
| 7,860,842 B2 | 12/2010 | Bronnikov et al. | |
| 7,861,226 B1 | 12/2010 | Episkopos et al. | |
| 7,971,193 B2 | 6/2011 | Li et al. | |
| 7,975,296 B2 | 7/2011 | Apfelbaum et al. | |
| 8,230,499 B1 | 7/2012 | Pereira | |
| 8,510,237 B2 | 8/2013 | Cascaval et al. | |
| 8,656,364 B1* | 2/2014 | Kolawa | G06F 8/74 717/126 |
| 8,819,772 B2 | 8/2014 | Bettini et al. | |
| 8,844,043 B2 | 9/2014 | Williams et al. | |
| 8,881,288 B1 | 11/2014 | Levy et al. | |
| 8,949,271 B2 | 2/2015 | Kocher et al. | |
| 9,128,728 B2 | 9/2015 | Siman | |
| 9,141,806 B2 | 9/2015 | Siman | |
| 9,317,399 B2 | 4/2016 | Boshernitsan et al. | |
| 9,882,930 B2 | 1/2018 | Holt | |
| 9,946,880 B2 | 4/2018 | Lee et al. | |
| 11,087,002 B2 | 8/2021 | Siman et al. | |
| 2002/0178281 A1 | 11/2002 | Aizenbud-Reshef et al. | |
| 2003/0056192 A1 | 3/2003 | Burgess | |
| 2004/0088689 A1 | 5/2004 | Hammes | |
| 2004/0205411 A1 | 10/2004 | Hong et al. | |
| 2004/0255277 A1 | 12/2004 | Berg et al. | |
| 2005/0015752 A1* | 1/2005 | Alpern | G06F 11/3604 717/131 |
| 2005/0198626 A1 | 9/2005 | Kielstra et al. | |
| 2005/0204344 A1 | 9/2005 | Shinomi | |
| 2005/0257207 A1 | 11/2005 | Blumfield et al. | |
| 2005/0273861 A1 | 12/2005 | Chess et al. | |
| 2006/0070048 A1 | 3/2006 | Li et al. | |
| 2006/0085858 A1 | 4/2006 | Noel et al. | |
| 2006/0253841 A1 | 11/2006 | Rioux | |
| 2006/0282453 A1 | 12/2006 | Tjong et al. | |
| 2007/0006170 A1 | 1/2007 | Hasse et al. | |
| 2007/0016949 A1 | 1/2007 | Dunagan et al. | |
| 2007/0044153 A1 | 2/2007 | Schuba et al. | |
| 2007/0074169 A1 | 3/2007 | Chess et al. | |
| 2007/0074188 A1 | 3/2007 | Huang et al. | |
| 2007/0083933 A1 | 4/2007 | Venkatapathy et al. | |
| 2007/0143759 A1 | 6/2007 | Ozgur et al. | |
| 2007/0239606 A1 | 10/2007 | Eisen | |
| 2007/0294281 A1 | 12/2007 | Ward et al. | |
| 2008/0209276 A1 | 8/2008 | Stubbs et al. | |
| 2008/0276317 A1 | 11/2008 | Chandola et al. | |
| 2009/0019545 A1 | 1/2009 | Ben-Itzhak et al. | |
| 2009/0094175 A1 | 4/2009 | Provos et al. | |
| 2009/0113550 A1 | 4/2009 | Costa et al. | |
| 2009/0183141 A1 | 7/2009 | Tai et al. | |
| 2009/0187992 A1 | 7/2009 | Poston | |
| 2009/0254572 A1 | 10/2009 | Redlich et al. | |
| 2009/0300764 A1 | 12/2009 | Freeman | |
| 2010/0011441 A1 | 1/2010 | Christodorescu et al. | |
| 2010/0043072 A1 | 2/2010 | Rothwell | |
| 2010/0050260 A1 | 2/2010 | Nakakoji et al. | |
| 2010/0058475 A1 | 3/2010 | Thummalapenta et al. | |
| 2010/0083240 A1* | 4/2010 | Siman | G06F 16/245 717/144 |
| 2010/0088688 A1* | 4/2010 | Edwards | G06F 8/4442 711/E12.001 |
| 2010/0088770 A1 | 4/2010 | Yerushalmi et al. | |
| 2010/0125913 A1 | 5/2010 | Davenport et al. | |
| 2010/0180344 A1 | 7/2010 | Malyshev et al. | |
| 2010/0198799 A1* | 8/2010 | Krishnan | G06F 11/3696 706/46 |
| 2010/0229239 A1 | 9/2010 | Rozenberg et al. | |
| 2010/0251210 A1 | 9/2010 | Amaral et al. | |
| 2010/0279708 A1 | 11/2010 | Lidsrom et al. | |
| 2010/0289806 A1 | 11/2010 | Lao et al. | |
| 2011/0004631 A1 | 1/2011 | Inokuchi et al. | |
| 2011/0030061 A1 | 2/2011 | Artzi et al. | |
| 2011/0034733 A1 | 2/2011 | Funahashi et al. | |
| 2011/0035800 A1 | 2/2011 | Atcha | |
| 2011/0191855 A1 | 8/2011 | De Keukelaere et al. | |
| 2011/0197177 A1* | 8/2011 | Mony | G06F 8/51 717/115 |
| 2011/0239294 A1 | 9/2011 | Kim et al. | |
| 2011/0239300 A1 | 9/2011 | Klein et al. | |
| 2012/0167229 A1 | 6/2012 | Molnar et al. | |
| 2012/0240185 A1 | 9/2012 | Kapoor et al. | |
| 2012/0272224 A1* | 10/2012 | Brackman | G06F 8/54 717/151 |
| 2013/0019314 A1 | 1/2013 | Ji et al. | |
| 2013/0024942 A1 | 1/2013 | Wiegenstein et al. | |
| 2013/0167241 A1 | 6/2013 | Siman | |
| 2013/0247198 A1 | 9/2013 | Muttik et al. | |
| 2013/0312102 A1* | 11/2013 | Brake | H04L 63/1433 726/25 |
| 2014/0068563 A1 | 3/2014 | Saltzman et al. | |
| 2014/0109227 A1 | 4/2014 | Kalman et al. | |
| 2014/0165204 A1 | 6/2014 | Williams et al. | |
| 2014/0281740 A1 | 9/2014 | Casado et al. | |
| 2014/0331327 A1 | 11/2014 | Maor et al. | |
| 2014/0372985 A1 | 12/2014 | Levin et al. | |
| 2015/0013011 A1 | 1/2015 | Brucker et al. | |
| 2015/0244737 A1* | 8/2015 | Siman | G06F 21/51 726/23 |
| 2015/0261955 A1 | 9/2015 | Huang et al. | |
| 2016/0182558 A1 | 6/2016 | Tripp | |
| 2017/0091457 A1 | 3/2017 | Zakorzhevsky et al. | |
| 2017/0255544 A1* | 9/2017 | Plate | G06F 21/577 |
| 2017/0270303 A1 | 9/2017 | Roichman et al. | |
| 2017/0289187 A1 | 10/2017 | Noel et al. | |
| 2018/0025161 A1 | 1/2018 | Gauthier et al. | |
| 2018/0107821 A1* | 4/2018 | Eshkenazi | G06F 21/52 |
| 2018/0330102 A1* | 11/2018 | Siman | G06F 11/3672 |
| 2019/0347422 A1* | 11/2019 | Abadi | G06F 16/9024 |
| 2021/0157583 A1* | 5/2021 | Yuile | G06F 21/552 |

FOREIGN PATENT DOCUMENTS

| | | |
|---|---|---|
| WO | 2005121953 A | 12/2005 |
| WO | 2008047351 A1 | 4/2008 |
| WO | 2016108162 A1 | 7/2016 |
| WO | 2016113663 A1 | 7/2016 |

OTHER PUBLICATIONS

Sreedhar et al., "A New Framework for Elimination-Based Data Flow Analysis Using DJ Graphs", ACM Transactions on Programming Languages and Systems, vol. 20, No. 2, pp. 368-407, Mar. 1998.

Helmer et al., "A Software Fault Tree Approach to Requirements Analysis of an Intrusion Detection System", 1st Symposium on Requirements Engineering for Information Security, Indianapolis, Indiana, USA, pp. 1-14, Mar. 2001.

Redgate, ".NET Reflector: Explore, Browse, and Analyze .NET assemblies", pp. 1-3, Jul. 2009, as downloaded from www.red-gate.com/productors/reflector.

Beyer et al., "The BLAST Query Language for Software Verification", Springer-Verlag Berlin Heidelberg, pp. 2-18, year 2004.

Srikant et al., "Mining Sequential Patterns: Generalizations and Performance Improvements", EDBT '96 Proceedings of the 5th International Conference on Extending Database Technology: Advances in Database Technology, pp. 3-17, Mar. 1996.

(56) References Cited

OTHER PUBLICATIONS

Zaki, M., "SPADE: An Efficient Algorithm for Mining Frequent Sequences", Machine Learning, vol. 42, pp. 31-60, year 2001.
Pei et al., in "Mining Sequential Patterns by Pattern-Growth: The PrefixSpan Approach," IEEE Transactions on Knowledge and Data Engineering, vol. 16, No. 10, pp. 1424-1440, Oct. 2004.
Martin et al., "Finding Application Errors and Security Flaws Using PQL: a Program Query Language", OOPSLA'05, pp. 365-383, Oct. 2005.
Yang et al., "Effective Sequential Pattern Mining Algorithms for Dense Database", National Data Engineering Workshops (DEWS), pp. 1-7, year 2004.
Ayres et al., "Sequential Pattern Mining using a Bitmap Representation", Proceedings of the eighth ACM SIGKDD international conference on Knowledge discovery and data mining, pp. 1-7, Jul. 2002.
Wang et al., "BIDE: Efficient Mining of Frequent Closed Sequence", Proceedings of 2010 International Conference on Information Retrieval & Knowledge Management, pp. 270-275, pp. 1-12, Mar. 2010.
Yan et al., "CloSpan: Mining Closed Sequential Patterns in Large Datasets", Proceedings of 2003 SIAM International Conference on Data Mining, pp. 1-12, May 2003.
"Design flaw in AS3 socket handling allows port probing", pp. 1-2, Oct. 15, 2008, as downloaded from http://scan.flashsec.org/.
Ford et al., "Analyzing and Detecting Malicious Flash Advertisements", Proceedings of ACSAC '09—Annual Computer Security Applications Conference, pp. 363-372, Dec. 7-11, 2009.
Livshits et al., "Finding Security Vulnerabilities in Java Applications with Static Analysis". Stanford University, computer science department, pp. 1-60, Sep. 25, 2005.
Symantec Corporation, "Symantec AdVantage: Dynamic Anti-Malvertising Solution", Data Sheet, pp. 1-4 pages, year 2012.
"Zero-day attack", pp. 1-4 pages, year 2008, as downloaded from http://en.wikipedia.org/wiki/Zero-day_attack.
Lange et al., "Comparing Graph-based Program Comprehension Tools to Relational Database-based Tools", IEEE 0-7695-1131-7/01, pp. 209-218, year 2001.
Skedzielewski et al., "Data flow graph optimization in IF1", Functional programming languages and computer architecture (book), publisher Springer Berlin Heidelberg, pp. 17-34, Aug. 22, 2013.
SAP, Java web application security best practice guide, SAP,Document version 2.0, pp. 1-48, May 2006.
Checkmarx CxQuery Language API Guide, V8.6.0 , pp. 1-217, Feb. 2018.
Zhenmin et al, "PR-Miner: Automatically Extracting Implicit Programming Rules and Detecting Violations in Large Software Code", ACM Sigsoft Software Engineering Notes, vol. 30, No. 5, pp. 306-315, Sep. 1, 2005.
Thummalapenta et al, "Alattin: Mining Alternative Patterns for detecting Neglected Conditions", 24th IEEE/ACM International Conference on IEEE Automated Software Engineering, pp. 283-294, Nov. 16, 2009.
Kim et al, "Supporting software development through declaratively codified programming patterns", Expert Systems with Applications, vol. 23, No. 4, pp. 405-413, Nov. 1, 2002.
Ashish et al., "Network Intrusion Detection Sequence mining—stide methodology", IT 608, Data Mining and Warehousing, Indian Institute of Technology, pp. 1-8, Apr. 20, 2005.
Goldsmith et al., "Relational Queries Over Program Traces", OOPSLA'05, pp. 1-18, Oct. 2005.
Yamada et al., "A defect Detection Method for Object-Oriented Programs using Sequential Pattern Mining", Information Processing Society of Japan (IPSJ) SIG Technical Report, vol. 2009-CSEC-45, pp. 1-8, Jun. 15, 2009.
Fukami et al., "SWF and the Malware Tragedy Detecting Malicious Adobe Flash Files", pp. 1-11, Mar. 9, 2008, as downloaded from https://www.owasp.org/images/1/10/OWASP-AppSecEU08-Fukami.pdf.
Cova et al., "Detection and Analysis of Drive-by-Download Attacks and Malicious JavaScript Code", Proceedings of the 19th international conference on World wide web, pp. 281-290, Jan. 1, 2010.
Sotirov., "Automatic Vulnerability Detection Using Static Source Code Analysis", Internet citation, pp. 1-118, Jan. 1, 2005.
Lam et al., "Context-Sensitive Program Analysis as Database Queries", ACM, PODS, pp. 1-12, year 2005.
Balzarotti et al., "Saner: Composing Static and Dynamic Analysis to Validate Sanitization in Web Applications", IEEE Symposium on Security and Privacy, pp. 387-401, May 18, 2018.
Coverity Inc., "Coverity® Development Testing Platform", pp. 1-5, year 2012.
Chess et al., "Dynamic Taint Propagation", pp. 1-70, Feb. 21, 2008.
EP Application # 21187307.0 Search Report dated Dec. 14, 2021.
Shuai et al., "Software Vulnerability Detection Based on Code Coverage and Test Cost", 11th International Conference on Computational Intelligence and Security (CIS), pp. 317-321, 2015.

* cited by examiner

DETECTING EXPLOITABLE PATHS IN APPLICATION SOFTWARE THAT USES THIRD-PARTY LIBRARIES

CROSS-REFERENCE TO RELATED APPLICATION

This application claims the benefit of U.S. Provisional Patent Application 63/057,534, filed Jul. 28, 2020, which is incorporated herein by reference.

FIELD OF THE INVENTION

The present invention relates generally to protecting against security vulnerabilities in computer programs, and particularly to methods, apparatus and software for evaluating application security.

BACKGROUND

Various techniques are known in the art for testing and protecting software applications against security vulnerabilities. A "vulnerability" in this context is a flaw or weakness in the application program that can be exploited by an unauthorized party (also referred to as an attacker) to gain access to secure information or otherwise modify the behavior of the program. For example, static application security testing (SAST) techniques are typically applied in order to detect security vulnerabilities in source code before the code is compiled and run.

Methods for finding vulnerabilities using SAST are described, for example, in U.S. Pat. No. 9,128,728, whose disclosure is incorporated herein by reference. This patent describes a tool that automatically analyzes source code for application-level vulnerabilities. Operation of the tool is based on static analysis, but it makes use of a variety of techniques, for example methods of dealing with obfuscated code.

The Common Vulnerabilities and Exposures (CVE) system provides a database of known vulnerabilities in publicly-available software packages. The Mitre Corporation maintains the system with funding from the United States Department of Homeland Security. The system assigns a CVE Identifier (also known as a CVE number) to serve as a unique, common identifier for each vulnerability that is reported to it.

SUMMARY

Embodiments of the present invention that are described hereinbelow provide improved methods, apparatus and software for detection of vulnerabilities in software code.

There is therefore provided, in accordance with an embodiment of the invention, a method for software code analysis, which includes receiving, into a memory of a computer, source code of an application program, which includes one or more calls from respective entry points in the source code to at least one library program. The source code is automatically analyzed in the computer in order to generate a first data flow graph (DFG), representing a flow of data to be engendered upon running the application program. One or more vulnerabilities are identified in the at least one library program. The at least one library program is automatically analyzed to generate at least one second DFG linking at least one of the entry points in the source code to at least one of the vulnerabilities. The first DFG is combined with the at least one second DFG in order to track the flow of data from the application program to the at least one of the vulnerabilities. It is reported, responsively to the tracked flow, that the at least one of the vulnerabilities is exploitable.

In a disclosed embodiment, identifying the one or more vulnerabilities includes looking up the at least one library program in a database of known vulnerabilities. Additionally or alternatively, the one or more calls from the respective entry points in the source code include invocations of methods in an application program interface (API) of the at least one library program. Further additionally or alternatively, the method includes identifying at least one of the library calls by detecting an unresolved method in the source code.

In some embodiments, identifying the one or more vulnerabilities includes identifying a parameter in the at least one library program, and wherein automatically analyzing the at least one library program includes finding a data flow path from the at least one of the entry points to the vulnerable parameter in the at least one library program. In a disclosed embodiment, combining the first DFG with the at least one second DFG includes tracking the flow of data through the first DFG and the at least one second DFG to the vulnerable parameter, and the at least one of the vulnerabilities is reported to be exploitable when the tracked flow links an input of the application program to the vulnerable parameter. Additionally or alternatively, the at least one of the vulnerabilities is reported as not being exploitable when the tracked flow indicates that the one or more calls from the application program to the at least one library program are not accessible via a data flow from inputs of the application program.

In one embodiment, the at least one library program includes a first library program, which includes a call to a second library program, and identifying the one or more vulnerabilities includes identifying a vulnerability in the second library program, and automatically analyzing the at least one library program includes generating the at least one second DFG so as to track the flow of data through the first library program to the vulnerability in the second library program.

There is also provided, in accordance with an embodiment of the invention, apparatus for software code analysis, including a memory configured to receive source code of an application program, which includes one or more calls from respective entry points in the source code to at least one library program. A processor is configured to automatically analyze the source code in the computer in order to generate a first data flow graph (DFG), representing a flow of data to be engendered upon running the application program, to identify one or more vulnerabilities in the at least one library program, to automatically analyze the at least one library program to generate at least one second DFG linking at least one of the entry points in the source code to at least one of the vulnerabilities, to combine the first DFG with the at least one second DFG in order to track the flow of data from the application program to the at least one of the vulnerabilities, and to report, responsively to the tracked flow, that the at least one of the vulnerabilities is exploitable.

There is additionally provided, in accordance with an embodiment of the invention, a computer software product, including a non-transitory computer-readable medium in which program instructions are stored, which instructions, when read by a computer, cause the computer to receive source code of an application program, which includes one or more calls from respective entry points in the source code to at least one library program, to automatically analyze the source code in the computer in order to generate a first data flow graph (DFG), representing a flow of data to be engendered upon running the application program, to identify one or more vulnerabilities in the at least one library program, to automatically analyze the at least one library program to generate at least one second DFG linking at least one of the entry points in the source code to at least one of the vulnerabilities, to combine the first DFG with the at least one second DFG in order to track the flow of data from the application program to the at least one of the vulnerabilities, and to report, responsively to the tracked flow, that the at least one of the vulnerabilities is exploitable.

The present invention will be more fully understood from the following detailed description of the embodiments thereof, taken together with the drawings in which:

DETAILED DESCRIPTION OF EMBODIMENTS

Figure 1:
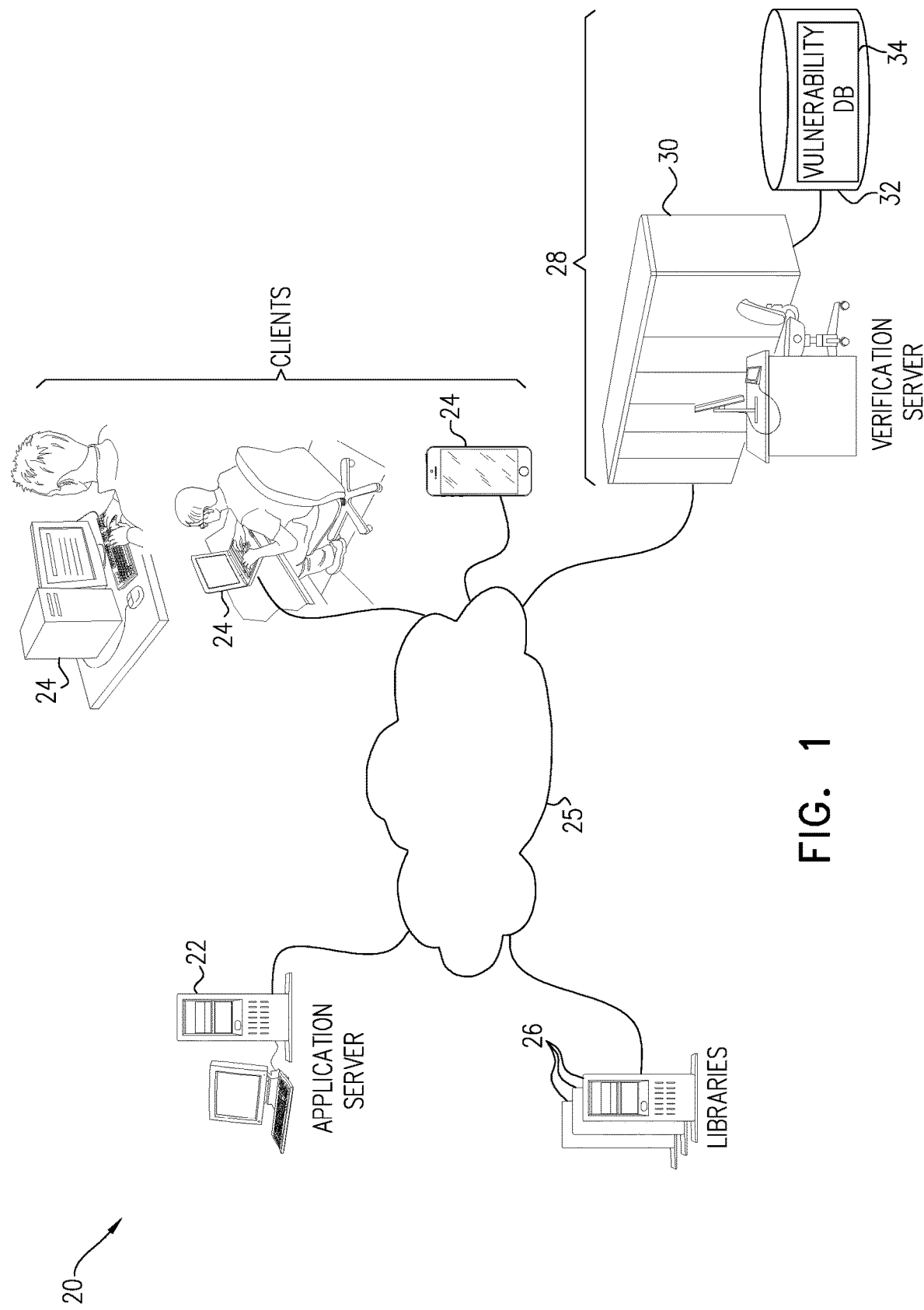
FIG. 1 is a block diagram that schematically illustrates a system for detection of vulnerabilities in software code, in accordance with an embodiment of the invention.

Software developers make frequent use of libraries of software code written by others in order to save time and effort in application program development. Third-party open-source libraries, such as the extensive libraries available on public platforms such as GitHub®, are particularly attractive to software developers, as they offer ready-made solutions to common problems encountered in programming. Third-party library programs, however, often have vulnerabilities, which can be exploited in mounting attacks on application programs that call the library programs.

Conscientious software developers may check for known vulnerabilities in library programs that they use, for example by looking them up in the CVE system mentioned above. This sort of checking is burdensome, however, and also tends to give a large number of false positive results, i.e., warnings of potential security flaws where in fact none exist. Specifically, a vulnerability in a library program will generally be exploitable, i.e., accessible to an attacker, only if the application program has an input that is linked through the program data flow to a vulnerable parameter in the library program. An attacker who discovers this link may then be able to trigger the vulnerability in the library program by setting the input of the application program to an appropriate value. If the application program does not contain such a link—for example because it calls the vulnerable method only with a constant parameter—the vulnerability will still exist, but it will not be exploitable.

There is thus a need for software analysis tools that are able to distinguish between exploitable and non-exploitable vulnerabilities in library programs used in an application under test, in order to alert software developers to actual security risks while minimizing false positive results. Such a tool can enable developers to focus their efforts where they are required and to avoid wasting time on vulnerabilities that are not exploitable. Embodiments of the present invention that are described herein address this need by providing software composition analysis tools that are capable of efficiently analyzing library programs together with the application program that calls them, and thus assessing which vulnerabilities of the library programs are exploitable and which are not.

In the disclosed embodiments, a computer receives into its memory source code of an application program, which includes one or more calls from respective entry points in the source code to one or more library programs. (These entry points typically correspond, for example, to invocations of methods in an application program interface (API) of the library program in question.) The computer automatically analyzes the source code in order to generate a data flow graph (DFG), which represents the flow of data engendered upon running the application program. This DFG typically represents only the application code, and not the library programs that it calls.

The computer also identifies one or more vulnerabilities in the library program or programs called by the application program, for example by looking up the library programs in a vulnerability database. It analyzes the library programs to generate DFGs linking the entry points from the application source code to the locations of the vulnerabilities that were identified in the library programs. These DFGs typically represent only the library code, and not the application program. The library DFGs may be computed on demand or, alternatively or additionally, they may be precomputed and stored in memory, for example in a database, for use when needed.

The computer then combines the DFG of the application program with the DFGs of the library programs in order to track the flow of data from the application program to the vulnerabilities in the library programs. Specifically, in the embodiments described below, the DFG of a given library program may identify a data flow path from an entry point (such as an API call) in the application source code to a vulnerable parameter in the library program. The computer tracks the flow of data through the DFGs of both the application program and the library program to the vulnerable parameter. The computer will report that a given vulnerability is exploitable when the tracked flow is found to link an input of the application program through the library program to the vulnerable parameter. Otherwise, when the tracked flow indicates that the relevant calls from the application program to the library program are not accessible through inputs of the application program (in the sense that there is no data flow from the inputs of the application program to the library program), the computer will report that the vulnerability is not exploitable and thus does not pose a security threat.

It commonly occurs that a first library program, which is called by an application program, will itself call a second library program. Thus, a vulnerability in the second library program may put the application program at risk. To deal with this sort of chained relationship (referred to herein as a "transient dependency"), the computer generates respective DFGs of both the first and second library programs. It uses both of these DFGs, together with the DFG of the application program, in order to track the flow of data from the application program through the library programs to the vulnerability in the second library program, and thus determines whether the vulnerability is exploitable.

FIG. 1 is a block diagram that schematically illustrates a system 20 for detection of vulnerabilities in software code of an application program, in accordance with an embodiment of the invention. The software code in the pictured example is stored on an application server 22, such as a suitable Web server, and runs on either or both of server 22 and client computers 24, which connect to server 22 via a network 25, such as the Internet. The application software includes calls to library programs, which may be stored and accessed on a library server 26.

Prior to deployment of the application program, a verification server 28 checks the application source code for security flaws. Server 28 comprises a memory 32, which receives and stores the source code of the application program, as well as of library programs, which are called from respective entry points in the application source code. Server 28 also comprises a processor 30, typically embodied in a general-purpose or special-purpose computer, which is programmed in software to carry out the functions that are described herein. The software may be downloaded to server 28 in electronic form, over a network, for example. Additionally or alternatively, the software may be provided and/or stored on tangible, non-transitory computer-readable media, such as magnetic, optical, or electronic memory. Memory 32 also holds the software that is run by processor 30 in performing the functions that are described herein.

As a part of its functionality in checking and reporting on security flaws in an application program, processor 30 identifies vulnerabilities in the library programs called by the application program. For this purpose, processor 30 typically looks up the library programs in a listing of vulnerabilities, which may be compiled as a vulnerability database 34, which may be based on the above-mentioned CVE database. Database 34 may be stored in memory 32 or, additionally or alternatively, the database may be accessed on a remote server (not shown) via network 25. Further additionally or alternatively, processor 30 may perform an independent analysis of relevant library programs in order to discover and record their vulnerabilities in memory 32.

In the present embodiment, for each known vulnerability, database 34 identifies the vulnerable method name and metadata, as well as vulnerable parameters in the method. These particular parameters are "vulnerable" in the sense that by manipulating the values of such parameters, an attacker can exploit a corresponding vulnerability in the software package. In other words, the parameters of a vulnerable method become "vulnerable parameters" by virtue of their usage in the method.

By way of example, the following is a record maintained in database 34 for CVE-2018-1000808—a vulnerability in a Python library called pyOpenSSL:

Library name—pyOpenSSL
  Affected library versions—1.0-17.4.9
  Vulnerable method metadata
    Relative path to file with vulnerable method—OpenSSL/crypto.py
    Class name of vulnerable method—no class
    Vulnerable method signature
      Method name—pkcs12
      Input parameters in order—buffer, passphrase
      Output parameters in order—no output
    Vulnerable parameters—buffer input parameter
  Vulnerability description
    CVE number—CVE-2018-1000808
    CVSS number—5.9
    Textual description of vulnerability and implications—Python Cryptographic. Authority pyopenssl version Before 17.5.0 contains a CWE—401: Failure to Release Memory Before Removing Last Reference vulnerability in PKCS #12 Store that can result in Denial of service if memory runs low or is exhausted.

The "CVSS number" listed above is a score between 0 and 10 indicating the relative severity of the vulnerability.

Server 28 applies various static application security testing (SAST) techniques in order to detect security vulnerabilities in the application source code. These functions are described in detail in the above-mentioned U.S. Pat. No. 9,128,728, and a full description is beyond the scope of the present patent application, which relates specifically, as explained above, to the problem of analyzing vulnerabilities that arise from the use of library programs.

For this latter purpose, server 28 applies the techniques of data flow graph (DFG) construction that are described specifically in columns 11-14 of U.S. Pat. No. 9,128,728 and illustrated in FIGS. 7-9. To summarize briefly, processor 30 derives an object-based representation, known as a document object model (DOM), of the software source code under analysis (such as the application code or the relevant library code). The processor uses the DOM to extract flow graphs of the code. These flow graphs typically include the data flow graph (DFG), which represents a flow of data that will be engendered when the code is run, and they may also include a control flow graph (CFG) and a control dependence graph (CDG). Processor 30 stores the analysis results in memory 32, for example in the form of a database to enable convenient access to the data thereafter.

Figure 2:
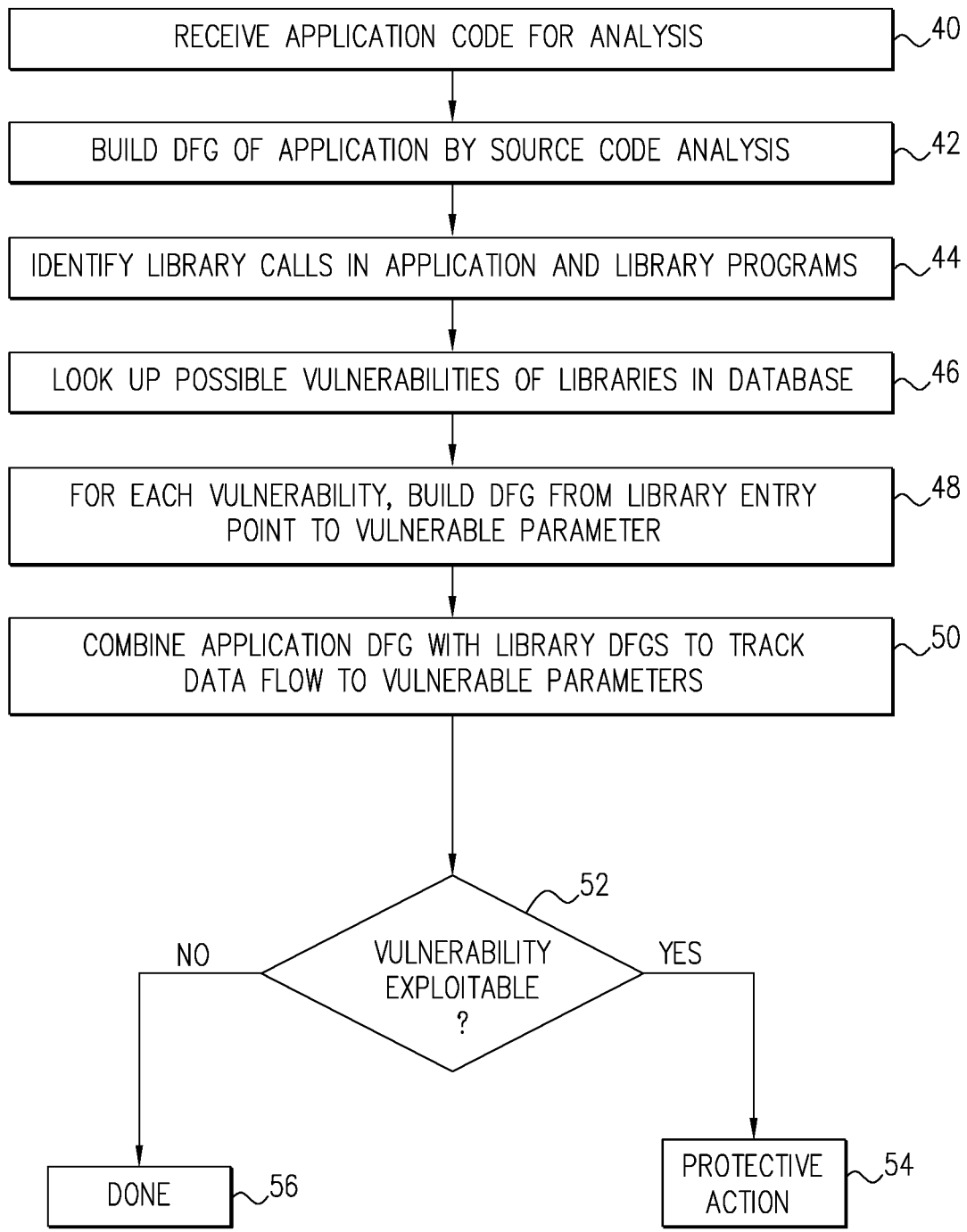
FIG. 2 is a flow chart that schematically illustrates a method for detection of vulnerabilities in a software application program, in accordance with an embodiment of the invention.

FIG. 2 is a flow chart that schematically illustrates a method for detection of vulnerabilities in a software application program, in accordance with an embodiment of the invention. The method is described, for the sake of clarity and concreteness, with reference to the elements of system 20, and particularly verification server 28. Alternatively, the method can be carried out in other suitable hardware configurations, on a dedicated verification server or on any other suitable computer.

To initiate the method, server 28 receives source code of an application program under test into memory 32, at a code reception step 40. The code includes one or more calls from respective entry points in the source code to at least one library program. Processor 30 applies the source code analysis techniques described above in building a DFG of the application program, at an application DFG generation step 42.

In addition, processor 30 identifies library calls in the application source code, at a call identification step 44. The library calls are the entry points from the application to the library programs and typically (although not necessarily) can be identified as invocations of methods in an API of a library program. (In identifying and analyzing the library calls, processor 30 may use data concerning libraries and their versions stored in a packages or manifest file, for example, although other data sources and logic may alternatively be used.) A given application program can include multiple library calls, which may be directed to the same library program or to multiple different library programs. Furthermore, at step 44, server 28 may retrieve and analyze the source code of the libraries called by the application program, in order to identify and analyze calls from these library programs to other library programs (creating "transient dependencies," as defined above).

Alternatively or additionally, processor 30 may identify library calls at step 44 by detecting "unresolved methods," i.e., methods that do not have a declaration in application source code. Such methods can be detected, for example, by generating and querying a model of the application code using a suitable SAST tool. If a method has no declaration in the application source code, it can be inferred that the declaration is in a library, and the relevant libraries can then be searched based on the methods imported to the application.

Processor 30 identifies vulnerabilities in the library programs found at step 44, for example by lookup in database 34, at a vulnerability identification step 46. For each library, the processor collects known vulnerabilities from the database, including details such as metadata of vulnerable methods in the library (including the method name, params, containing class, and relative path in the library) and the vulnerable parameter or parameters in each vulnerable method. For example, the following data can be collected and saved per vulnerability:

Library metadata:
   Library name
   Affected library versions
Vulnerable method metadata:
   elative path in library to the file that contains the vulnerable method
   Class name of vulnerable method, if exists
   Vulnerable method signature
      Method name
      Input parameters in order
      Output parameters in order
Vulnerable parameters—input parameters, class members, global objects, etc., which can be used in exploiting the vulnerability.

For each vulnerability found at step 46, processor 30 analyzes the corresponding library program in order to build a DFG of the library program, at a library DFG generation step 48. Alternatively or additionally, the processor may retrieve a pre-computed DFG, for example, from memory 32. In general, each such DFG links one of the entry points found at step 44 in the application source code to a vulnerability in a library program. In the case of transient dependencies, however, the DFG will track the flow of data from an entry point in one library program that calls a second library program to a vulnerable parameter in the second library program.

Processor 30 combines the DFG of the application program built at step 42 with the DFGs of vulnerable library programs built at step 48, in order to track the flow of data from the application program to the vulnerable parameters in the library programs, at a DFG combination step 50. Based on the combined DFG, processor 30 decides whether the vulnerability in the library program is exploitable, at an exploitability evaluation step 52.

Generally speaking, when the data flow tracked through the combined DFGs is found to link an input of the application program to a vulnerable parameter in a library program, processor 30 will identify the vulnerability of the library program as exploitable and will initiate a protective action, at a protection step 54. For example, if a user input to the application program is tracked to the queue of a vulnerable library program, which has an inner thread for handling the elements in the queue, the combined DFG will identify the vulnerability as exploitable. The protective action taken at step 54 typically comprises issuance of a report that an exploitable vulnerability has been found. Alternatively or additionally, step 54 may involve more proactive protection, such as halting compilation of the application program until the vulnerability is resolved, or inserting a routine to "sanitize" the problematic input before it reaches the vulnerable library program.

Alternatively, when the tracked flow indicates at step 52 that a given vulnerability found at step 46 is not exploitable, the method will terminate at a completion step 56. (Server 28 may still report the vulnerability that was found, but will indicate that it presents little or no risk, since it is not exploitable in the existing application configuration.) Specifically, when analysis of the DFGs indicates that the vulnerability in a certain library program is not accessible through any input of the application program that calls the library program (meaning, as noted above, that there is no data flow from the inputs of the application program to the vulnerability), the vulnerability will be considered non-exploitable. This sort of finding will arise, for example, when the application program calls the library program with a constant or other parameter that is not affected by the inputs to the application program.

Example with Transient Dependency

In the following example, an application program calls Library A, which is a library for writing a REST web server. Library A calls Library B to handle HTTP requests. Hence, there is a transient dependency from the application code to Library B. Meanwhile, Library B is known to be vulnerable to an attack via a crafted HTTP request, making Library A, and thus the application program, vulnerable to this sort of attack, as well. By tracing an HTTP request using the DFGs, server 28 constructs the exploitable path from the application program to the vulnerable parameter in Library B, as illustrated below.

Library B:

```
class HttpHandler {
    // Has a vulnerability that can be triggered by a crafted
    // "rawData"
    public static HttpPacket parseRawData(byte[ ] rawData) {...}
}
```

Library A:

```
Import HttpHandler;
class RestApiHandler {
    public RestApiHandler(Map<string, Method>
    endpointToMethod) {...}
    private void handleHttpPacket(byte[ ] rawData) {
        // Triggers the vulnerability
        HttpPacket packet =
        HttpHandler.parseRawData(rawData);
        // Find relevant endpoint from URL and call the
        appropriate method
    }
}
```

APPLICATION CODE

```
Import RestApiHandler;
class MyRestApi {
    // Method that receives user input
    public byte[ ] getNextPacketRawData( ) {...}
    public void main( ) {
        RestApiHandler restApiHandler(...);
        while (true) {
            byte[ ] rawData = getNextPacketRawData( );
            restApiHandler.handleHttpPacket(rawData);
        }
    }
}
```

Figure 3:
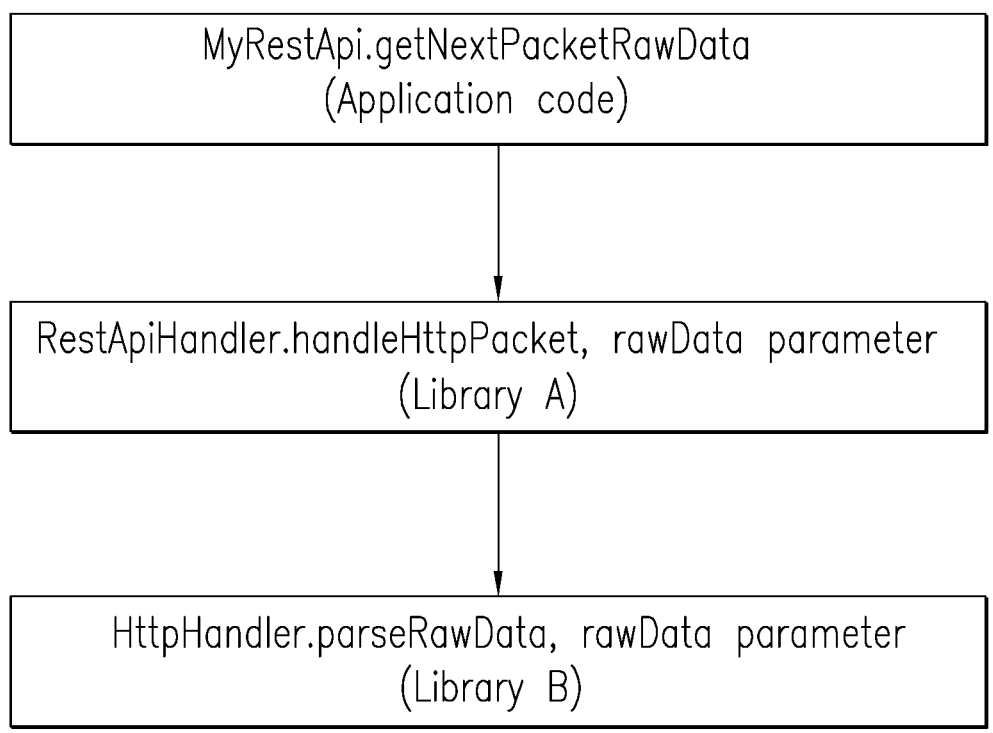
FIG. 3 is an example data flow graph, in accordance with an embodiment of the invention.

FIG. 3 is a combined DFG representing the path from a user input to the vulnerability in Library B, in accordance with an embodiment of the invention. In this example, the application code imports the class RestApiHandler from Library A, which in turn imports the class HttpHandler from Library B. The combined DFG is built across application code, Library A and Library B. The application code receives user input via the getNextPacketRawData( ) method. Since the data flow reaches the vulnerable method and its vulnerable parameter in Library B, server 28 will report that the vulnerability is exploitable.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for software code analysis, comprising:
receiving, into a memory of a computer, source code of an application program, which includes one or more calls from respective entry points in the source code to at least one library program;
automatically analyzing the source code in the computer in order to generate a first data flow graph (DFG), representing a flow of data to be engendered upon running the application program;
identifying one or more vulnerabilities in the at least one library program;
automatically analyzing the at least one library program to generate at least one second DFG linking at least one of the entry points in the source code to at least one of the vulnerabilities;
combining the first DFG with the at least one second DFG in order to track the flow of data from the application program to the at least one of the vulnerabilities; and
reporting, responsively to the tracked flow, that the at least one of the vulnerabilities is exploitable.

2. The method according to claim 1, wherein identifying the one or more vulnerabilities comprises looking up the at least one library program in a database of known vulnerabilities.

3. The method according to claim 1, wherein the one or more calls from the respective entry points in the source code comprise invocations of methods in an application program interface (API) of the at least one library program.

4. The method according to claim 1, and comprising identifying at least one of the library calls by detecting an unresolved method in the source code.

5. The method according to claim 1, wherein identifying the one or more vulnerabilities comprises identifying a vulnerable parameter in the at least one library program, and wherein automatically analyzing the at least one library program comprises finding a data flow path from the at least one of the entry points to the vulnerable parameter in the at least one library program.

6. The method according to claim 5, wherein combining the first DFG with the at least one second DFG comprises tracking the flow of data through the first DFG and the at least one second DFG to the vulnerable parameter, and wherein the at least one of the vulnerabilities is reported to be exploitable when the tracked flow links an input of the application program to the vulnerable parameter.

7. The method according to claim 6, wherein the at least one of the vulnerabilities is reported as not being exploitable when the tracked flow indicates that the one or more calls from the application program to the at least one library program are not accessible via a data flow from inputs of the application program.

8. The method according to claim 1, wherein the at least one library program comprises a first library program, which includes a call to a second library program, and
wherein identifying the one or more vulnerabilities comprises identifying a vulnerability in the second library program, and
wherein automatically analyzing the at least one library program comprises generating the at least one second DFG so as to track the flow of data through the first library program to the vulnerability in the second library program.

9. Apparatus for software code analysis, comprising:
a memory configured to receive source code of an application program, which includes one or more calls from respective entry points in the source code to at least one library program; and
a processor configured to automatically analyze the source code in the computer in order to generate a first data flow graph (DFG), representing a flow of data to be engendered upon running the application program, to identify one or more vulnerabilities in the at least one library program, to automatically analyze the at least one library program to generate at least one second DFG linking at least one of the entry points in the source code to at least one of the vulnerabilities, to combine the first DFG with the at least one second DFG in order to track the flow of data from the application program to the at least one of the vulnerabilities, and to report, responsively to the tracked flow, that the at least one of the vulnerabilities is exploitable.

10. The apparatus according to claim 9, wherein the processor is configured to identify the one or more vulnerabilities by looking up the at least one library program in a database of known vulnerabilities.

11. The apparatus according to claim 9, wherein the one or more calls from the respective entry points in the source code comprise invocations of methods in an application program interface (API) of the at least one library program.

12. The apparatus according to claim 9, wherein the processor is configured to identify at least one of the library calls by detecting an unresolved method in the source code.

13. The apparatus according to claim 9, wherein the processor is configured to identify a vulnerable parameter in the at least one library program, and to find a data flow path from the at least one of the entry points to the vulnerable parameter in the at least one library program.

14. The apparatus according to claim 13, wherein the processor is configured to track the flow of data through the first DFG and the at least one second DFG to the vulnerable parameter, and wherein the at least one of the vulnerabilities is reported to be exploitable when the tracked flow links an input of the application program to the vulnerable parameter.

15. The apparatus according to claim 14, wherein the at least one of the vulnerabilities is reported as not being exploitable when the tracked flow indicates that the one or more calls from the application program to the at least one library program are not accessible via a data flow from inputs of the application program.

16. The apparatus according to claim 9, wherein the at least one library program comprises a first library program, which includes a call to a second library program, and wherein the processor is configured to identify a vulnerability in the second library program and to generate the at least one second DFG so as to track the flow of data through the first library program to the vulnerability in the second library program.

17. A computer software product, comprising a non-transitory computer-readable medium in which program instructions are stored, which instructions, when read by a computer, cause the computer to receive source code of an application program, which includes one or more calls from respective entry points in the source code to at least one library program, to automatically analyze the source code in the computer in order to generate a first data flow graph (DFG), representing a flow of data to be engendered upon running the application program, to identify one or more vulnerabilities in the at least one library program, to automatically analyze the at least one library program to generate at least one second DFG linking at least one of the entry points in the source code to at least one of the vulnerabilities, to combine the first DFG with the at least one second DFG in order to track the flow of data from the application program to the at least one of the vulnerabilities, and to report, responsively to the tracked flow, that the at least one of the vulnerabilities is exploitable.

18. The product according to claim 17, wherein the instructions cause the computer to identify the one or more vulnerabilities by looking up the at least one library program in a database of known vulnerabilities.

19. The product according to claim 17, wherein the one or more calls from the respective entry points in the source code comprise invocations of methods in an application program interface (API) of the at least one library program.

20. The product according to claim 17, wherein the instructions cause the computer to identify at least one of the library calls by detecting an unresolved method in the source code.

21. The product according to claim 17, wherein the instructions cause the computer to identify a vulnerable parameter in the at least one library program, and to find a data flow path from the at least one of the entry points to the vulnerable parameter in the at least one library program.

22. The product according to claim 21, wherein the instructions cause the computer to track the flow of data through the first DFG and the at least one second DFG to the vulnerable parameter, and wherein the at least one of the vulnerabilities is reported to be exploitable when the tracked flow links an input of the application program to the vulnerable parameter.

23. The product according to claim 22, wherein the at least one of the vulnerabilities is reported as not being exploitable when the tracked flow indicates that the one or more calls from the application program to the at least one library program are not accessible via a data flow from inputs of the application program.

24. The product according to claim 17, wherein the at least one library program comprises a first library program, which includes a call to a second library program, and wherein the instructions cause the computer to identify a vulnerability in the second library program and to generate the at least one second DFG so as to track the flow of data through the first library program to the vulnerability in the second library program.

* * * * *